UNITED STATES PATENT OFFICE.

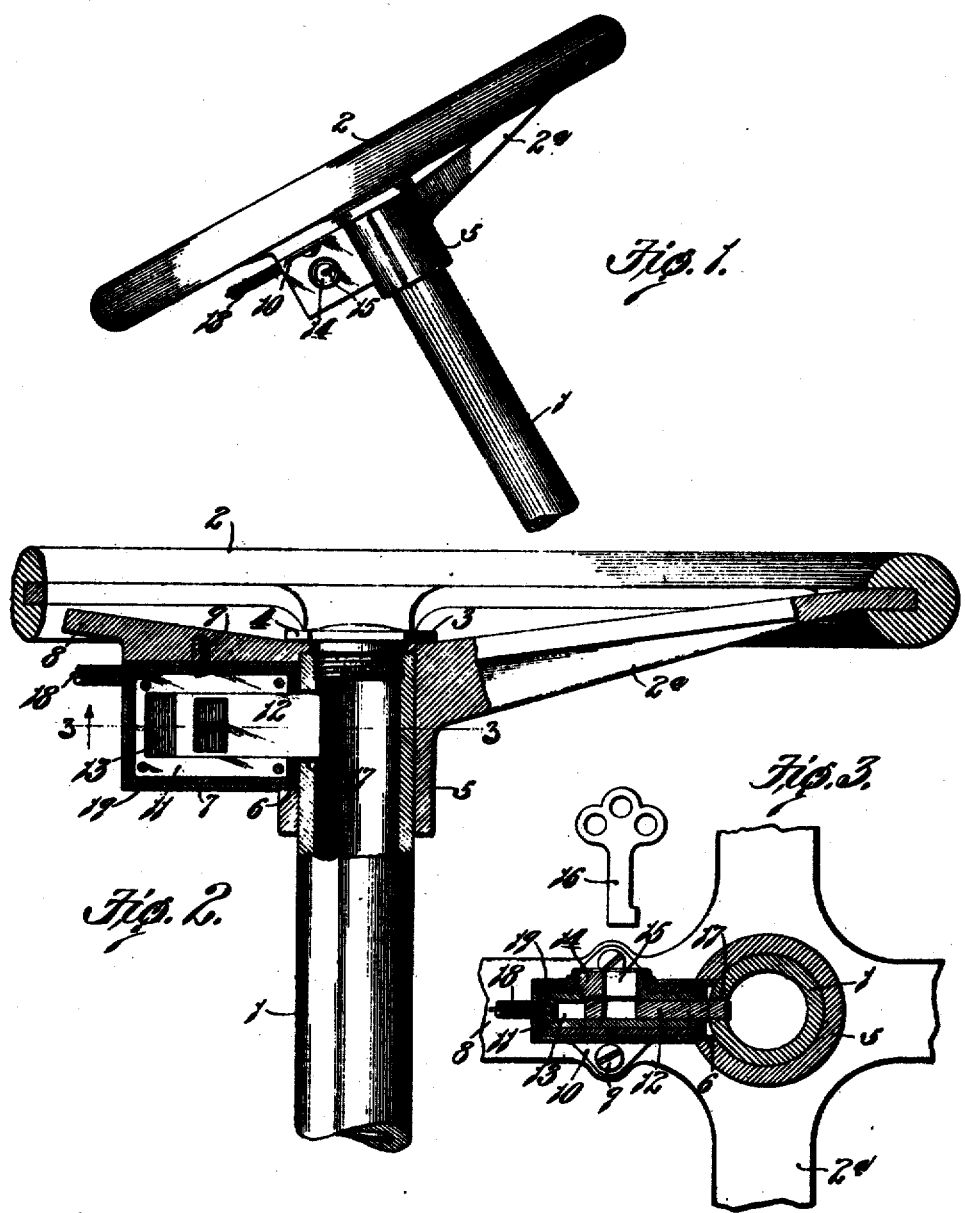

HENRY MAYER, OF ST. LOUIS, MISSOURI, ASSIGNOR OF ONE-HALF TO FREDERICK MAYER, OF ST. LOUIS, MISSOURI.

AUTOMOBILE.

1,003,768. Specification of Letters Patent. Patented Sept. 19, 1911.

Application filed May 31, 1910. Serial No. 564,259.

*To all whom it may concern:*

Be it known that I, HENRY MAYER, a citizen of the United States, residing at the city of St. Louis, State of Missouri, have invented a certain new and useful Improvement in Automobiles, of which the following is a specification, reference being had to the accompanying drawings, forming a part hereof, in which—

Figure 1 is a perspective view of the steering-post and steering-wheel of an automobile equipped with my invention; Fig. 2 is a sectional view through the steering-post and steering-wheel shown in Fig. 1; and Fig. 3 is a sectional view on the line 3—3, Fig. 2.

This invention relates to a new and useful improvement in automobiles, the object of my invention being, broadly, to provide means adapted to prevent the unauthorized use or stealing of automobiles and the like.

With this object in view, my invention resides in the novel construction of the several parts thereof and in the novel arrangement and combination of the same, all as will hereinafter be described and afterward pointed out in the claims.

In the drawings, wherein like reference characters refer to like parts throughout the several views, 1 indicates the steering-post of an automobile, and 2 indicates the steering-wheel. Both said steering-post and steering-wheel may be of any approved construction, said steering-post 1 being, as usual, preferably metallic and the spider 2ª of wheel 2 being likewise, as usual, preferably metallic. Steering-wheel 2 is adapted to be loosely or movably arranged on said post 1, wheel 2 being provided with any suitable means, such as preferably an inwardly-extending annular flange or collar 3, adapted to support said wheel in proper position thereon. Wheel 2 is also preferably secured against removal from post 1, as by a nut 4, see particularly Fig. 2.

The hub 5 of wheel 2 is vertically slotted or cut-out, as at 6, to receive and support one end of a preferably rectangular shaped housing or casing 7, the end of said casing or housing 7 in said hub 5 being preferably open, for purposes hereinafter appearing. This housing or casing 7 is preferably of any suitable metallic sheet material and is adapted to fit smoothly at its upper side against the under side of a spoke, as, for instance, spoke 8, of spider 2ª of wheel 2 and is secured to said spoke by means of suitable securing screws or bolts 9, said housing or casing 7 being provided with suitable outwardly-extending flanges 10 through which said screws or bolts 9 are adapted to pass.

Arranged in housing or casing 7 is a suitable lock 11 of any approved construction, this lock 11, as is usual, comprising a metallic locking-member or bolt 12 slidable in a guide-way 13, a rotatable member or tumbler 14 provided with a suitable key-slot 15 adapted to receive a suitable key 16, and preferably any suitable means (not shown) adapted to coöperate with said key when said locking-member or bolt 12 is projected into locking or operative position or returned to unlocking or inoperative position. As shown clearly in Fig. 3, housing or casing 7 is provided in a side thereof with a suitable opening, as required, to accommodate said rotatable member or tumbler 14 and the portion of the side or wall of lock 11 therearound.

Steering-post 1 is provided with a suitable recess or opening, as at 17, see particularly Figs. 2 and 3, adapted to receive the forward end of said locking-member or bolt 12 when the same is projected by said key into locking or operative position, said locking-member or bolt 12 being thus adapted to releasably hold said wheel 2 in operative engagement with said steering-post 1. When said locking-member or bolt 12 is projected into locking or operative position by said key 16, as will readily be seen, the steering-post 1 may be operated or turned by said wheel 2, as required, to direct or guide front wheels of the automobile with which said steering-post is usually connected; when, however, said locking-member or bolt 12 is in unlocking or inoperative position, wheel 2 will be loose and free to rotate on steering-post 1 and said steering-post will not be operated or turned, or said front wheels directed, thereby.

18 indicates the ground-wire leading from the battery or batteries controlling the spark-coils for the engine of the automobile. This wire has usually been heretofore connected, so far as I am aware, to, and the spark-circuit thereby grounded through, some metallic portion of the body of the automobile and said circuit thus completed. As the said battery or batteries and spark-coils for igniting the fluid in the engine of the automobile form no part of my invention, the same have not been herein shown. I prefer, however, instead of connecting said wire 18 to a metallic portion of the body of the automobile, as has been heretofore the custom, as stated, to electrically connect said wire 18 to said lock 11, which is preferably of any suitable metallic material, suitable insulation 19 being preferably placed around said lock 11 and interposed between said lock 11 and said housing or casing 7, as shown clearly in Fig. 3. Now, when said locking-member or bolt 12 is in unlocking or inoperative position, as will be seen, the spark or ignition circuit is broken and the engine of the automobile cannot be operated; when, however, said locking-member or bolt 12 has been projected into locking or operative position and said steering-wheel 2 thereby held, as described, in operative engagement with said steering-post 1, said locking-member or bolt 12 will contact with said post 1 and said circuit will be completed and grounded directly through said post 1, and the engine of the automobile may now be operated. As is well known, the strength or amperage of the electric current flowing through said wire 18 is so small that there is very little, if any, danger or liability of an electric shock by contact with said steering-post 1 or steering-wheel 2 when said locking-member or bolt 12 is in locking or operative position, as described.

From the foregoing, it will be obvious that, when the automobile is not in use, the locking-member or bolt 12 can be readily brought by a proper key 16 to unlocking or inoperative position, when said spark or ignition circuit will be broken and said steering-wheel 2 operatively disengaged from and loose on said post 1, as before described, and the automobile cannot now be used or operated until said locking-member or bolt 12 is again projected into engagement with said post 1. As a proper key 16 is, however, required to so actuate said locking-member or bolt 12, it will be seen that this can only be accomplished by a duly authorized person or one having possession of such a key.

My invention can be easily applied to automobiles now on the market and, while comparatively simple, fully accomplishes the object hereinbefore stated.

While I have herein shown and described my invention as applied to an automobile, and for which use it is particularly applicable, yet it may equally well be applied to other vehicles; and I am also aware that minor changes in the construction, arrangement, and combination of the several parts of my invention may be made and substituted for those herein shown and described without departing from the nature and principle of my invention.

Having thus described my invention, what I claim and desire to secure by Letters Patent is:

1. The combination with the spark-circuit of a self-propelled vehicle, of a steering-post provided with a recess or opening adapted to form part of said circuit, a steering-wheel loosely mounted on said post, and a metallic locking-member movably arranged on said wheel adapted to removably engage with said recess or opening to releasably hold said wheel in operative engagement with said post and to complete or break said circuit through said post, the ground-wire of said circuit being electrically connected to said locking-member and said circuit being completed or grounded through said post when said locking-member is in engagement with said recess or opening; substantially as described.

2. The combination with the spark-circuit of a self-propelled vehicle, of a metallic steering-post provided with a recess or opening, a steering-wheel loosely arranged on said post, and a metallic locking-member arranged on and insulated from said wheel adapted to be removably projected into said recess or opening to releasably hold said wheel in operative engagement with said post and to removably contact with said post to complete or break said circuit through said post, the ground wire of said circuit being electrically connected to said locking-member; substantially as described.

3. The combination with the spark-circuit of a self-propelled vehicle, of a metallic steering-post provided with a recess or opening, a metallic steering-wheel loosely arranged on said post, a metallic housing arranged on said wheel, a metallic lock arranged in and insulated from said housing, and a metallic locking-member movably arranged in said lock and adapted to be removably projected into said recess or opening to releasably hold said wheel in operative engagement with said post and to removably contact with said post to complete or break said circuit through said post, the ground-wire of said circuit being electrically connected to said lock; substantially as described.

In testimony whereof, I have signed my name to this specification in the presence of two subscribing witnesses.

HENRY MAYER.

Witnesses:
 GEORGE C. EICHBAUM,
 CAROLINE L. WEBER.